US011015826B2

(12) United States Patent
Sundararajan et al.

(10) Patent No.: US 11,015,826 B2
(45) Date of Patent: May 25, 2021

(54) AUTOMATED CLIMATE CONTROL SYSTEM WITH OVERRIDE

(71) Applicant: Lennox Industries Inc., Richardson, TX (US)

(72) Inventors: Anuradha Sundararajan, Allen, TX (US); John Manby, McKinney, TX (US); Anna Vishinsky, Little Elm, TX (US); Alan E. Bennett, Denton, TX (US); Rosa Maria Leal, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 186 days.

(21) Appl. No.: 15/209,233

(22) Filed: Jul. 13, 2016

(65) Prior Publication Data

US 2018/0017277 A1 Jan. 18, 2018

(51) Int. Cl.
*F24F 11/30* (2018.01)
*G05D 23/19* (2006.01)
*F24F 110/70* (2018.01)
*F24F 120/12* (2018.01)
*F24F 110/20* (2018.01)
(Continued)

(52) U.S. Cl.
CPC .............. *F24F 11/30* (2018.01); *G05D 23/19* (2013.01); *F24F 2110/10* (2018.01); *F24F 2110/20* (2018.01); *F24F 2110/50* (2018.01); *F24F 2110/70* (2018.01); *F24F 2120/10* (2018.01);
(Continued)

(58) Field of Classification Search
CPC .. F24F 11/30; F24F 11/50; F24F 11/54; F24F 11/56; F24F 11/57; F24F 11/58; F24F 11/59; F24F 11/61; F24F 11/65; F24F 11/67; F24F 11/0012; F24F 11/0015; F24F 11/0017; F24F 11/0034; F24F 2110/50; F24F 2120/10; F24F 2120/20; F24F 2011/0026; F24F 2011/0035; F24F 2011/0056; G05D 23/19; G05D 23/1902;
(Continued)

(56) References Cited

U.S. PATENT DOCUMENTS 4,931,948 A * 6/1990 Parker ................... F24F 11/30
236/1 C
5,285,961 A * 2/1994 Rodriguez, Jr. .... G05D 23/1902
236/47
(Continued)

OTHER PUBLICATIONS

KMC Controls; Installation and Operation Guide; Revision C; 903-019-01C; 8 pages.
(Continued)

*Primary Examiner* — Tavia Sullens
(74) *Attorney, Agent, or Firm* — Baker Botts L.L.P.

(57) ABSTRACT

According to one embodiment, a system includes at least one of a cooling system and a heating system, an automation controller, a sensor, and a switch. The automation controller provides a first input indicating a first temperature set point. The sensor detects a temperature of a second space proximate the sensor and provides a second input indicating the temperature of the second space and a second temperature set point. The switch activates at least one of the cooling system and the heating system based on the second temperature set point in response to a determination that the second input overrides the first input.

9 Claims, 7 Drawing Sheets

(51) Int. Cl.
  *F24F 120/10* (2018.01)
  *F24F 110/50* (2018.01)
  *F24F 110/10* (2018.01)
  *F24F 140/40* (2018.01)

(52) U.S. Cl.
  CPC ....... *F24F 2120/12* (2018.01); *F24F 2140/40* (2018.01)

(58) Field of Classification Search
  CPC ............. G05D 23/1905; F25B 2700/02; F25B 2700/2104; F25B 2600/07; F25B 2600/23
  See application file for complete search history.

(56) References Cited

U.S. PATENT DOCUMENTS

| | | | | |
|---|---|---|---|---|
| 5,341,988 | A * | 8/1994 | Rein | G05D 23/1905 |
| | | | | 236/49.3 |
| 5,996,898 | A * | 12/1999 | Parker | F24F 11/30 |
| | | | | 236/51 |
| 2008/0076346 | A1 * | 3/2008 | Ahmed | F24F 11/30 |
| | | | | 454/256 |
| 2011/0112875 | A1 * | 5/2011 | Johnson | G06Q 10/063 |
| | | | | 705/7.11 |
| 2015/0045966 | A1 * | 2/2015 | Chen | F24F 11/30 |
| | | | | 700/277 |
| 2015/0369505 | A1 * | 12/2015 | Malve | F24F 11/30 |
| | | | | 700/276 |

OTHER PUBLICATIONS

KMC Controls; Installation Guide; STE-6010/6011/6013/6015; 866-019-03C; 2 pages, 2012.

KMC Controls; STE-6000 Series Room Temperature Sensors/Transmitters; 866-035-02F; 2 pages, 2011.

KMC Controls; Installation and Operation Guide; BAC-7302 and BAC-7302C Advanced Applications Controller; Revision D; 905-019-53D; 20 pages.

KMC Controls; BAC-7302/7302C Advanced Application Controller for Roof Top Units; 905-035-63G; 2 pages, 2012.

* cited by examiner

AUTOMATED CLIMATE CONTROL SYSTEM WITH OVERRIDE

TECHNICAL FIELD

This disclosure relates generally to a climate control system, specifically an automated climate control system with an override.

BACKGROUND

Climate control systems cool and/or heat a space based on certain temperature set points. In certain applications, climate control systems may be automated and/or controlled so that the temperature set points change based on certain conditions.

SUMMARY OF THE DISCLOSURE

According to one embodiment, a system includes at least one of a cooling system and a heating system, an automation controller, a sensor, and a switch. The automation controller provides a first input indicating a first temperature set point. The sensor detects a temperature of a second space proximate the sensor and provides a second input indicating the temperature of the second space and a second temperature set point. The switch activates at least one of the cooling system and the heating system based on the second temperature set point in response to a determination that the second input overrides the first input.

According to another embodiment, a climate control system controller includes a receiver, a temperature control engine, and a switch. The receiver receives a first input from an automation controller and a second input from a sensor. The first input indicates a first temperature set point at which a climate control system is to activate. The second input indicates a temperature of a space and a second temperature set point. The temperature control engine determines that the second temperature set point is lower than the temperature of the space, and that the second input overrides the first input. The switch activates the climate control system in response to the determination that the second temperature set point is lower than the temperature of the space and the determination that the second input overrides the first input.

According to yet another embodiment, a method includes receiving a first input from an automation controller and a second input from a sensor. The first input indicates a first temperature set point at which a climate control system is to activate. The second input indicates a temperature of a space and a second temperature set point. The method also includes determining that the second temperature set point is lower than the temperature of the space and that the second input overrides the first input. The method further includes activating the climate control system in response to the determination that the second temperature set point is lower than the temperature of the space and the determination that the second input overrides the first input.

Certain embodiments may provide one or more technical advantages. For example, an embodiment allows for greater control over the temperature of a space by allowing a user to override an automated temperature set point. As another example, an embodiment allows for a climate control system to provide greater comfort to a user by allowing the user to override an automation-set temperature. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 5 of the drawings, like numerals being used for like and corresponding parts of the various drawings.

Climate control systems cool and heat a space based on certain temperature set points. In certain applications, climate control systems may be automated and/or controlled so that the temperature set points change based on certain conditions. For example, temperature set points may be changed based on whether the space is occupied or unoccupied. As another example, temperature set points may be changed based on an external temperature. In an automated system, the system may determine whether the temperature set point should be changed and if so change to the set point automatically.

Figure 1:
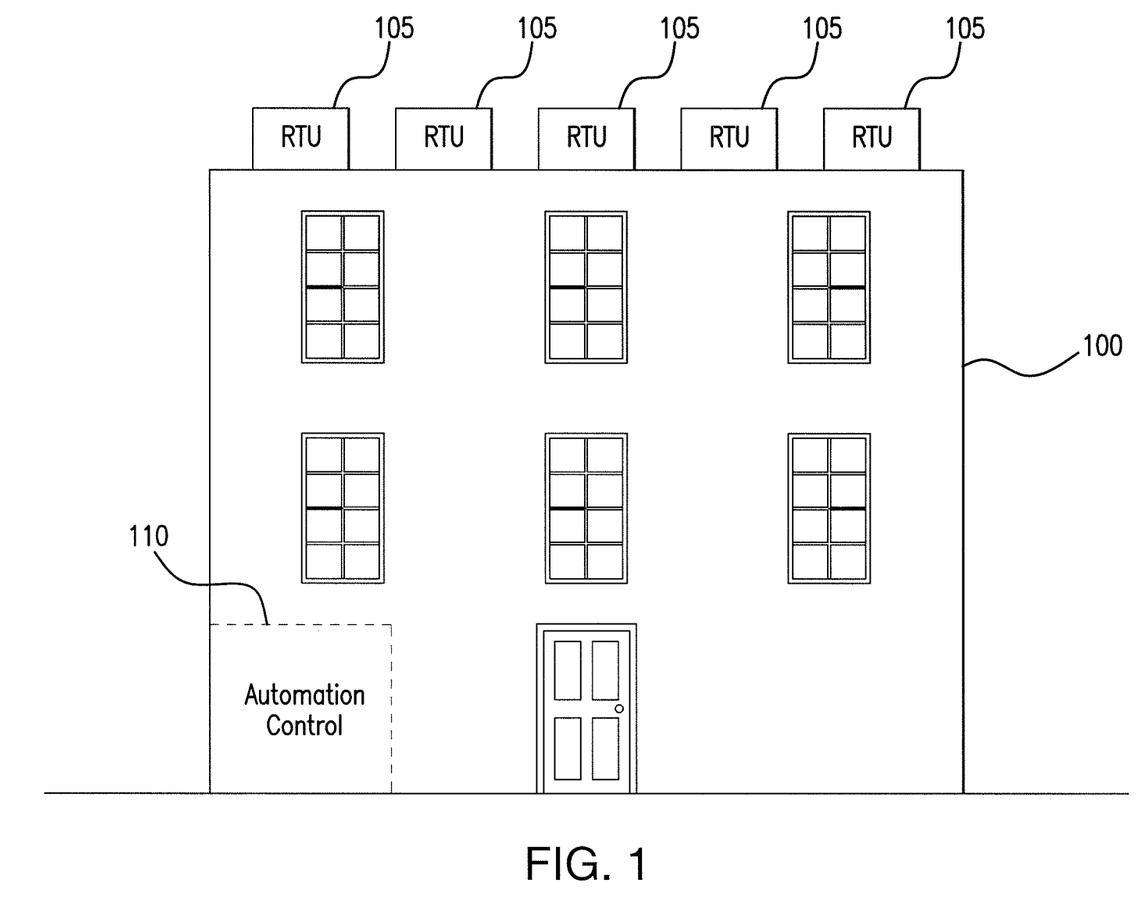
FIG. 1 illustrates an example building with automation control.

FIG. 1 illustrates an example building with automation control. As illustrated in FIG. 1, a building 100 includes several rooms. Each room may be serviced by a climate control system. Each climate control system operates to cool and/or heat the room. Each climate control system includes a rooftop unit (RTU) 105. Each RTU 105 operates to cool and/or heat the room.

Each RTU 105 and/or climate control system may be automated by an automation control 110. Automation control 110 may set temperature set points for each RTU 105 based on certain criteria. For example, if a room is not occupied, automation control 110 may set the temperature set point so that the RTU 105 does not operate as frequently. As another example, if a temperature external to building 100 is cold, for example in the winter, automation control 110 may set a temperature set point so that RTU 105 does not operate as frequently.

One disadvantage of an automated climate control system, such as that illustrated in FIG. 1, is that an individual in a room may not have the ability to control the temperature set points for the RTU 105 for that room. As a result, automation control 110 may have RTU 105 operating too frequently and/or not frequently enough for that particular individual. As an example, an individual may desire for the room to be held at 75 degrees Fahrenheit, but automation control 110 may have the temperature set point set at 70 degrees Fahrenheit. As a result, the RTU 105 for the room may keep the room at a temperature that the individual considers to be too cold. However, the individual has no mechanism through which to alter the temperature set point set by automation control 110.

This disclosure contemplates a climate control system and a climate control system controller that allow an individual to override the temperature set points set by an automation control. The individual can change the temperature set point and override a temperature set point set by automation control. In some embodiments, the system limits the amount of change (e.g., number of degrees) in the temperature set point. For example, the system may limit the user to a maximum change of five degrees. In this manner, the system prevents the individual from overriding the temperature set point to a point that stresses the system and/or that is uncomfortable. The climate control system will operate based on the individual's chosen temperature set point for a period of time and then revert back to a temperature set point set by automation control. In this manner, the climate control system and climate control system controller allow for the individual to control the temperature set point of an automated system. Furthermore, the climate control system and climate control system controller improve the comfort of the individual. The climate control system and/or climate control system controller will be described in more detail using FIGS. 2 through 5.

Figure 2:
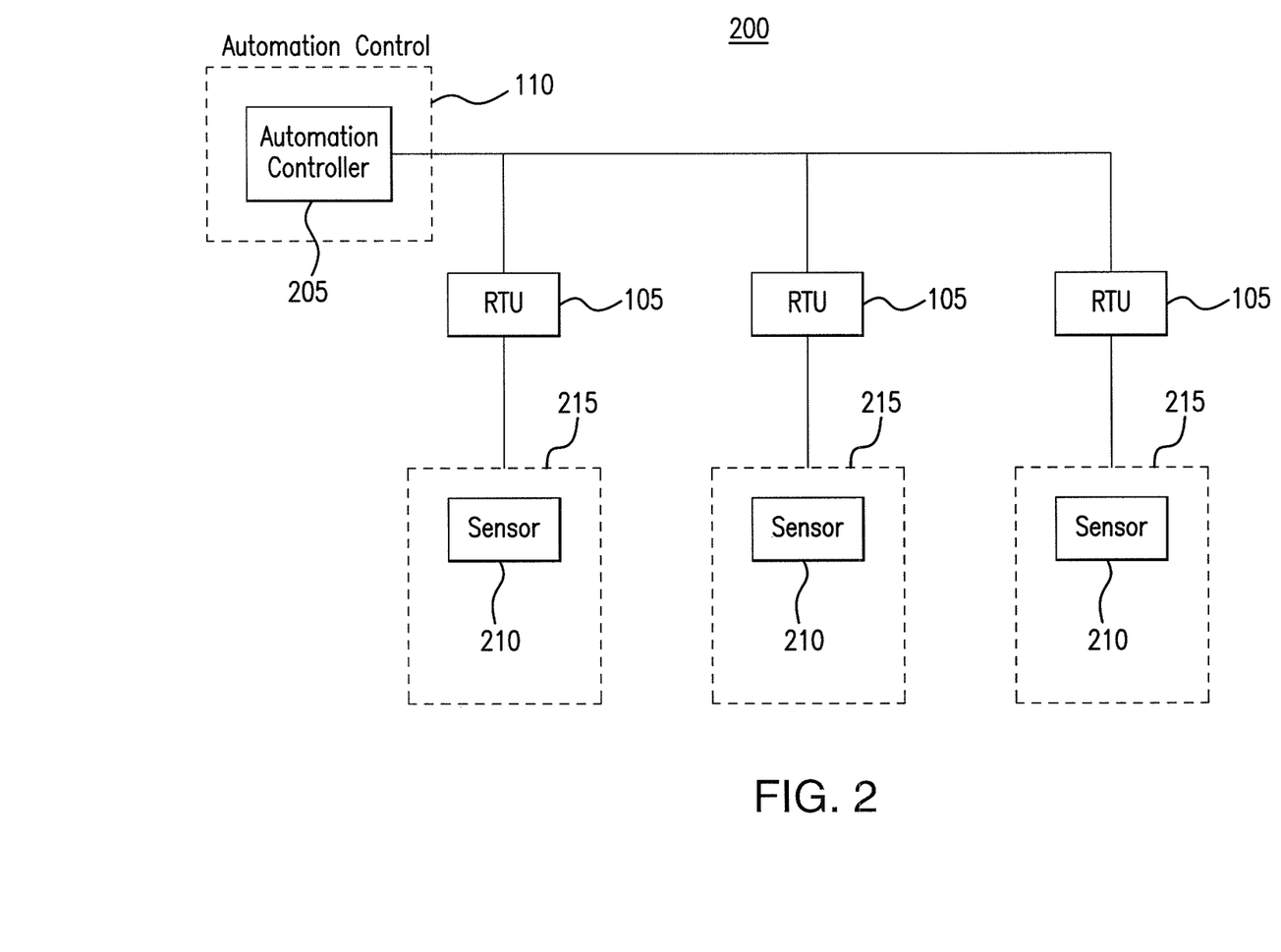
FIG. 2 illustrates an example climate control system.

FIG. 2 illustrates an example climate control system 200. As illustrated in FIG. 2, climate control system 200 includes an automation control 110, one or more RTUs 105, and one or more sensors 210. In particular embodiments, climate control system 200 allows for each sensor 210 to override temperature set points set by automation control 110.

Automation control 110 allows for automation of one or more RTUs 105. For example, automation control 110 may operate an RTU 105 based on temperature set points. These temperature set points may be set based on various conditions such as, for example, the occupancy of a space, external temperature, and/or time of day. Automation control 110 may include an automation controller 205 that establishes and operates the automation of climate control system 200. In particular embodiments, automation control 110 may be a Building Automation and Control network (BACnet) and automation controller 205 may be a BACnet controller.

One disadvantage of existing automation controls 110 is that there is no way to modify and/or override the temperature set points set by automation control 110. As a result, each RTU 105 may operate more or less frequently than a user desires, which causes a space to be colder and/or hotter than desired. The contemplated climate control system 200 includes sensors 210 that are allowed to override automation control 110.

Each sensor 210 may be located in a space 215 such as, for example, a room of a building. Each sensor 210 may detect various environmental conditions of the space 215 proximate the sensor such as, for example, a temperature, a humidity, a carbon dioxide level, etc. Each sensor 210 may then report the detected information to an RTU 105. The RTU 105 may then activate and/or deactivate based on the detected information and on the temperature set points set by automation control 110 and/or sensor 210.

Each sensor 210 includes an adjustment mechanism through which a user can adjust a temperature set point for the particular RTU 105. If the user does not change the temperature set point, then RTU 105 will use the temperature set point set by automation control 110. If the user changes the temperature set point, then RTU 105 may override the temperature set point set by automation control 110 with the temperature set point set by the user using sensor 210. RTU 105 may then operate based on the user's desired temperature set point for a period of time and then revert back to the temperature set point set by automation control 110. In this manner, climate control system 200 improves the comfort of the user.

In some embodiments, the adjustment mechanism allows a user to change the occupancy status of a space 215 (e.g., from unoccupied to occupied). If automation control 110 indicates that the space 215 is unoccupied, but the user adjusts the occupancy status to occupied using the adjustment mechanism, then RTU 105 operates based on temperature set points for an occupied space 215 rather than an unoccupied space 215. Effectively, the user uses sensor 210 to override the occupancy status (and the temperature set points with some limitations) set by automation control 110.

This disclosure contemplates that a sensor 210 is different from a thermostat. For example, a thermostat will activate and/or deactivate a climate control system whereas a sensor 210 can only provide signals to a climate control system (e.g. to a controller of a climate control system). The sensor 210 cannot provide signals to activate and/or deactivate a climate control system.

In particular embodiments, climate control system 200 includes one or more dehumidifiers. Each sensor 210 may detect a humidity of the space 215 proximate the sensor 210. Based on the detected humidity, climate control system 200 may activate and/or deactivate the one or more dehumidifiers to adjust the humidity of the space 215. In this manner, the comfort of the space 215 and the user may be improved.

In certain embodiments, climate control system 200 includes one or more dampers that control intake of air external to a building such as, for example, building 100. Each sensor 210 may also detect a carbon dioxide level of the space 215 proximate the sensor. Based on the detected carbon dioxide level of the space 215, climate control system 200 may adjust a position of the dampers to allow more or less external air to flow into the space 215. In this manner, climate control system 200 may adjust the carbon dioxide level of the space 215 thereby improving the comfort of the space 215 and/or the user.

In certain embodiments, the one or more RTUs 105, the one or more sensors 210, and the automation control 110 are not located in the same spaces. For example, the one or more RTUs 105 may be located on the rooftop of a building. Each sensor 210 may be located in a different room of the building, and the automation control 110 may be located in an administrative room and/or a maintenance room of the building.

In some embodiment, automation controller 205 communicates with RTU 205 over a protocol that is different from the protocol over which sensor 210 communicates with RTU 105. For example, automation controller 205 may communicate with RTU 205 over a Building Automation and Control Network protocol while sensor 210 communicates with RTU 105 over a different (and in some instances proprietary) protocol. In this manner, bandwidth over the Building Automation and Control Network may be reserved for communications between the automation controller 205 and RTU 105.

Figure 3A:
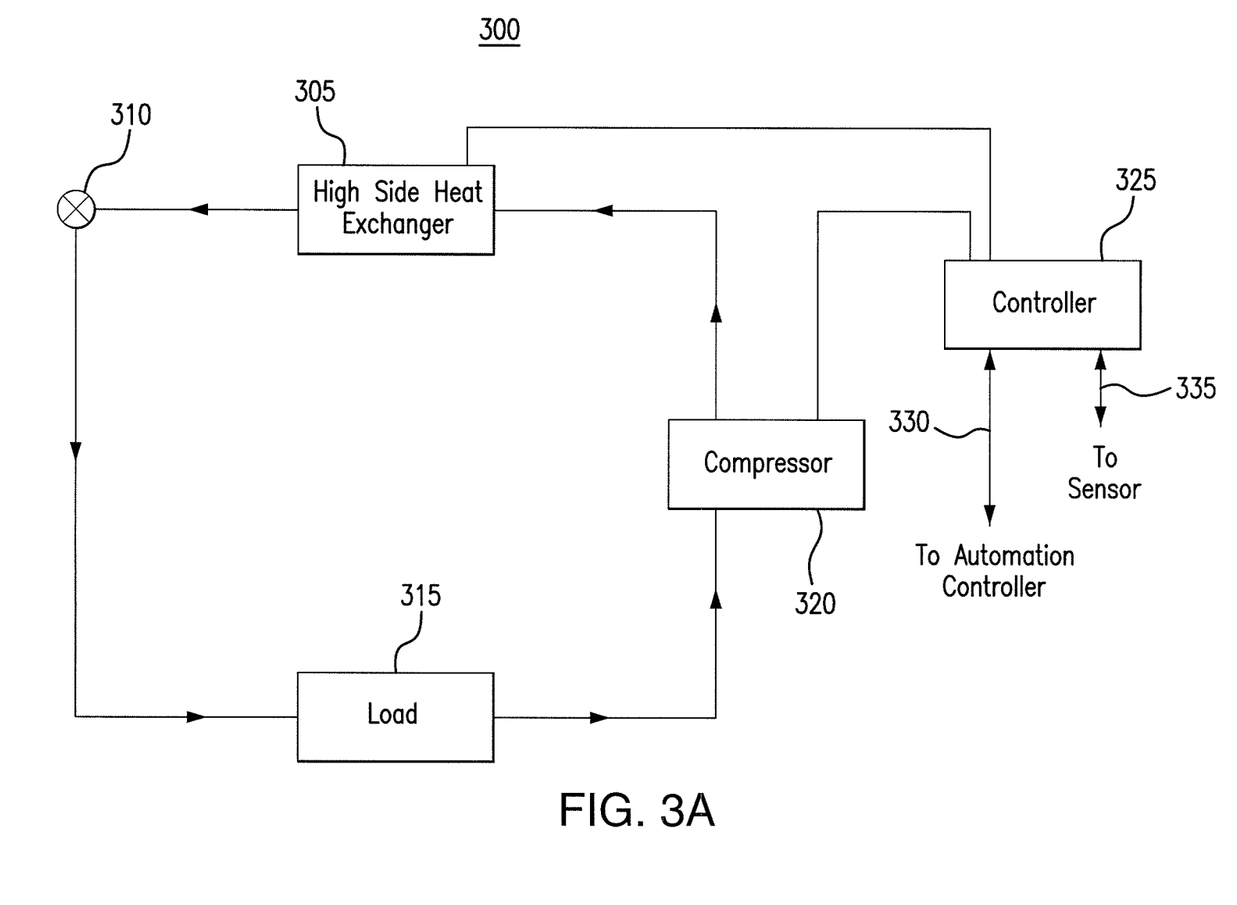
FIG. 3A illustrates an example cooling system.

FIG. 3A illustrates an example cooling system 300. Cooling system 300 may form a portion of climate control system 200 and/or RTU 105 shown in FIG. 2. As illustrated in FIG. 3A, cooling system 300 includes a high side heat exchanger 305, an expansion valve 310, a load 315, a compressor 320, and a controller 325. In particular embodiments, controller 325 may allow for a temperature set point set by automation control to be overridden by a temperature set point set by an individual user.

This disclosure contemplates one or more components of cooling system 300 forming an RTU 105. For example, an RTU 105 may include high side heat exchanger 305, expansion valve 310, load 315, compressor 320, and/or controller 325. In some embodiments, controller 325 may be coupled to an external housing of RTU 105. This disclosure contemplates cooling system 300 and/or climate control system 200 including additional components that are not illustrated, such as for example, a flash tank and/or additional compressors and expansion valves.

High side heat exchanger 305 may remove heat from the refrigerant. When heat is removed from the refrigerant, the refrigerant is cooled. This disclosure contemplates high side heat exchanger 305 being operated as a condenser and/or a gas cooler. When operating as a condenser, high side heat exchanger 305 cools the refrigerant such that the state of the refrigerant changes from a gas to a liquid. When operating as a gas cooler, high side heat exchanger 305 cools the refrigerant but the refrigerant remains a gas. In certain configurations, high side heat exchanger 305 is positioned such that heat removed from the refrigerant may be discharged into the air. For example, high side heat exchanger 305 may be positioned on a rooftop so that heat removed from the refrigerant may be discharged into the air. As another example, high side heat exchanger 305 may be positioned external to a building and/or on the side of a building.

Expansion valve 310 reduces the pressure and therefore the temperature of the refrigerant. Expansion valve 310 reduces pressure from the refrigerant flowing into the expansion valve 310. The temperature of the refrigerant may then drop as pressure is reduced. As a result, warm or hot refrigerant entering expansion valve 310 may be cooler when leaving expansion valve 310. The refrigerant leaving expansion valve 310 is fed to load 315.

Refrigerant may flow from expansion valve 310 to load 315. When the refrigerant reaches load 315, the refrigerant removes heat from the air around load 315. As a result, the air is cooled. The cooled air may then be circulated such as, for example, by a fan, to cool a space, such as a room of a building. As refrigerant passes through load 315, the refrigerant may change from a liquid state to a gaseous state.

Refrigerant may flow from load 315 to compressor 320. This disclosure contemplates system 100 including any number of compressors 320. Compressor 320 may be configured to increase the pressure of the refrigerant. As a result, the heat in the refrigerant may become concentrated and the refrigerant may become a high pressure gas. Compressor 320 may then send the compressed refrigerant to high side heat exchanger 305.

Controller 325 may activate and/or deactivate components of cooling system 300. For example, controller 325 may activate high side heat exchanger 305 and/or compressor 320 based on temperature set points. In one example, controller 325 may receive a temperature set point from automation controller 205 over line 330. Then controller 325 may receive a detected temperature of a space from sensor 210 over line 335. Controller 325 compares the detected temperature and the temperature set point to determine whether high side heat exchanger 305 and/or compressor 320 should be activated and/or deactivated. For example, if the detected temperature is lower than the temperature set point, then controller 325 may deactivate high side heat exchanger 305 and/or compressor 320. If the detected temperature is higher than the temperature set point, then controller 325 may activate high side heat exchanger 305 and/or compressor 320 to cool a space 215.

Controller 325 may allow a user to override the temperature set points provided by automation controller 205 over line 330. For example, the user may operate an adjustment mechanism of a sensor 210 in a space 215 to provide a different temperature set point. When controller 325 determines that a new temperature set point has been provided by the user, controller 325 may operate cooling system 300 based on the user's temperature set point rather than the temperature set point provided by automation controller 205. For example, if the detected temperature of a space is 75 degrees Fahrenheit and the temperature set point provided by automation controller 205 is 80 degrees Fahrenheit, then controller 325 may not normally activate high side heat exchanger 305 and/or compressor 320. However, if a user provides a new temperature set point of 73 degrees Fahrenheit, then controller 325 may allow the user's temperature set point to override the temperature set point provided by automation controller 205. As a result, controller 325 may activate high side heat exchanger 305 and/or compressor 320 based on the user's temperature set point to cool a space 215.

In particular embodiments, controller 325 may operate cooling system 300 based on a user's temperature set point for a period of time. For example, automation control 110 may be programmed to allow controller 325 to operate using a user's temperature set point for a set period of time such as, for example, 15 minutes. When controller 325 determines that the user's temperature set point should override the temperature set point provided by automation control 110 and that the user's temperature set point is lower than the detected temperature of the space, controller 325 may activate high side heat exchanger 305 and/or compressor 320 and start running a timer for 15 minutes. When the timer expires, controller 325 may revert back to the temperature set point provided by automation control 110 and deactivate high side heat exchanger 305 and/or compressor 320. In some embodiments, automation controller 205 cancels the override at the expiration of the timer to cause controller 325 to revert back to the temperature set point provided by automation control 110. In this manner, a user may override the temperature set point provided by automation control 110 for a period of time. As a result, controller 325 prevents a user's temperature set point from overriding automation control 110 for an undesirable period of time.

In certain embodiments, automation control 110 may be programmed to ignore a user's temperature set points. In these instances, automation control may provide signals to controller 325 that indicate that the user's temperature set point should be ignored and/or overridden. In response, controller 325 may operate cooling system 300 based on temperature set points provided by automation control 110 and activate/deactivate high side heat exchanger 305 and/or compressor 320 accordingly.

Figure 3B:
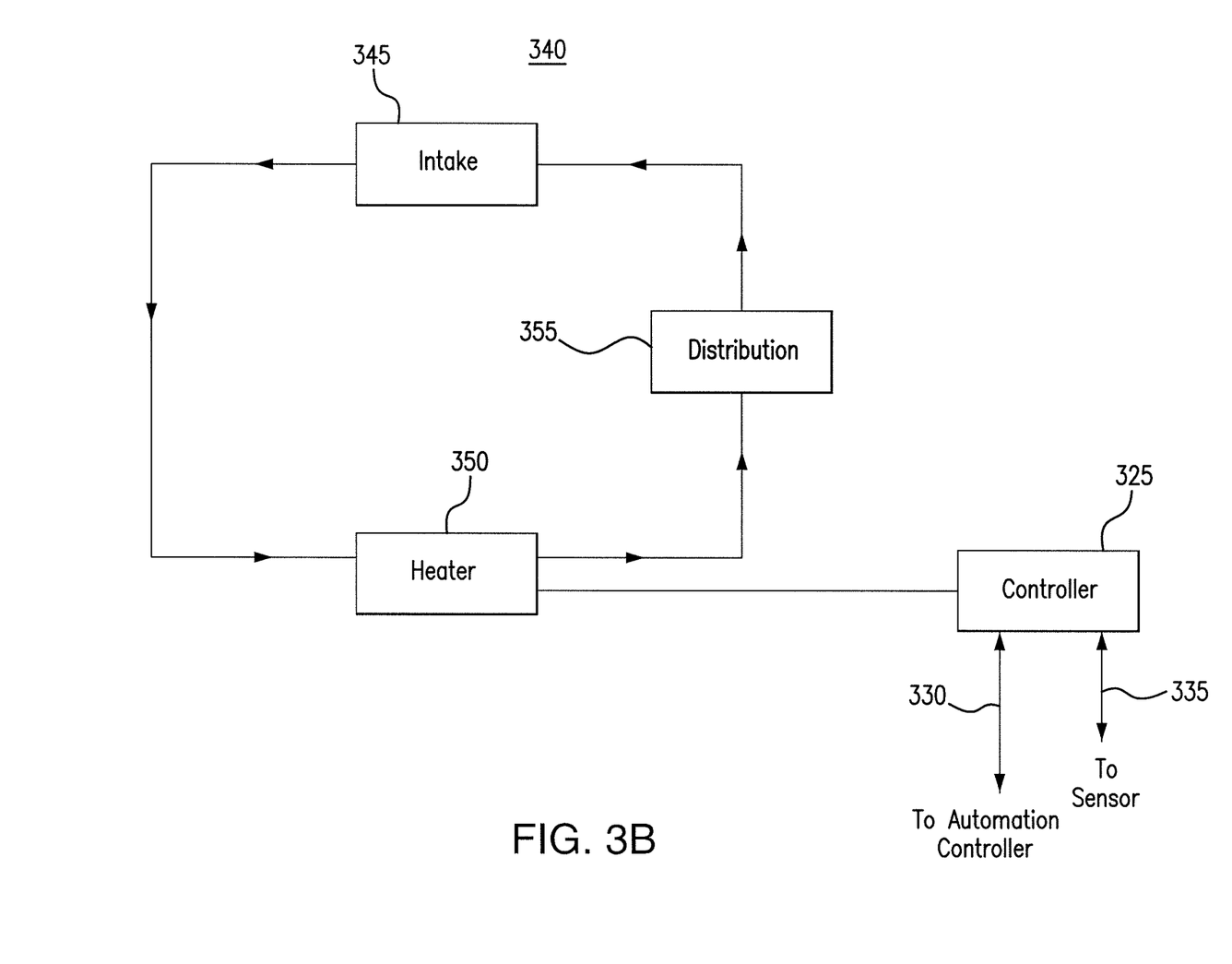
FIG. 3B illustrates an example heating system.

FIG. 3B illustrates an example heating system 340. Heating system 340 may form a portion of climate control system 200 and/or RTU 105 shown in FIG. 2. As illustrated in FIG. 3B, heating system 340 includes an intake 345, a heater 350, a distribution 355, and controller 325. In particular embodiments, controller 325 may allow for a temperature set point set by automation control to be overridden by a temperature set point set by an individual user.

This disclosure contemplates one or more components of heating system 340 forming an RTU 105. For example, an RTU 105 may include intake 345, heater 350, distribution 355, and/or controller 325. In some embodiments, controller 325 may be coupled to an external housing of RTU 105. This disclosure contemplates heating system 340 and/or climate control system 200 including additional components that are not illustrated.

Intake 345 may receive and/or collect colder air internal and/or external to building 100. Intake 345 then circulates this colder air to heater 350 to be heated. This disclosure contemplates intake 345 including any appropriate components such as for example one or more fans, one or more vents, and one or more ventilation shafts.

Heater 350 receives the colder air from intake 345 and heats that air to produce a warmer air. Heater 350 then circulates that warmer air to distribution 355 to heat a space 215. This disclosure contemplates heater 350 including any appropriate components such as for example a furnace, a boiler, and/or a heat pump. This disclosure further contemplates heater 350 using gas or electric supplies.

Distribution 355 receives the warmer air from heater 350 and circulates that warmer air throughout a space 215 to heat the space 215. As that warmer air heats the space 215, the air cools and is taken back to heater 350 by intake 345. This disclosure contemplates distribution 355 including any appropriate components such as for example one or more fans, one or more vents, and one or more ventilation shafts.

Controller 325 may activate and/or deactivate components of heating system 340. For example, controller 325 may activate heater 350 and/or one or more fans. In one example, controller 325 may receive a temperature set point from automation controller 205 over line 330. Then controller 325 may receive a detected temperature of a space from sensor 210 over line 335. Controller 325 compares the detected temperature and the temperature set point to determine whether heating system 340 should be activated and/or deactivated. For example, if the detected temperature is higher than the temperature set point, then controller 325 may deactivate heating system 340. If the detected temperature is lower than the temperature set point, then controller 325 may activate heating system 340 to heat a space 215.

Controller 325 may allow a user to override the temperature set points provided by automation controller 205 over line 330. For example, the user may operate an adjustment mechanism of a sensor 210 in a space 215 to provide a different temperature set point and/or change the occupancy status of space 215. When controller 325 determines that a new temperature set point should be set, controller 325 may operate heating system 340 based on the user's temperature set point rather than the temperature set point provided by automation controller 205. For example, if the detected temperature of a space is 75 degrees Fahrenheit and the temperature set point provided by automation controller 205 is 70 degrees Fahrenheit, then controller 325 may not normally activate heating system 340. However, if a user provides a new temperature set point of 78 degrees Fahrenheit, then controller 325 may allow the user's temperature set point to override the temperature set point provided by automation controller 205. As a result, controller 325 may activate heating system 340 based on the user's temperature set point to heat a space 215.

In particular embodiments, controller 325 may operate heating system 340 based on a user's temperature set point for a period of time. For example, automation control 110 may be programmed to allow controller 325 to operate using a user's temperature set point for a set period of time such as, for example, 15 minutes. When controller 325 determines that the user's temperature set point should override the temperature set point provided by automation control 110 and that the user's temperature set point is higher than the detected temperature of the space, controller 325 may activate heating system 340 and start running a timer for 15 minutes. When the timer expires, controller 325 may revert back to the temperature set point provided by automation control 110 and deactivate heating system 340. In this manner, a user may override the temperature set point provided by automation control 110 for a period of time. As a result, controller 325 prevents a user's temperature set point from overriding automation control 110 for an undesirable period of time.

In certain embodiments, automation control 110 may be programmed to ignore a user's temperature set points. In these instances, automation control may provide signals to controller 325 that indicate that the user's temperature set point should be ignored and/or overridden. In response, controller 325 may operate heating system 340 based on temperature set points provided by automation control 110 and activate/deactivate heating system 340 accordingly.

Figure 3C:
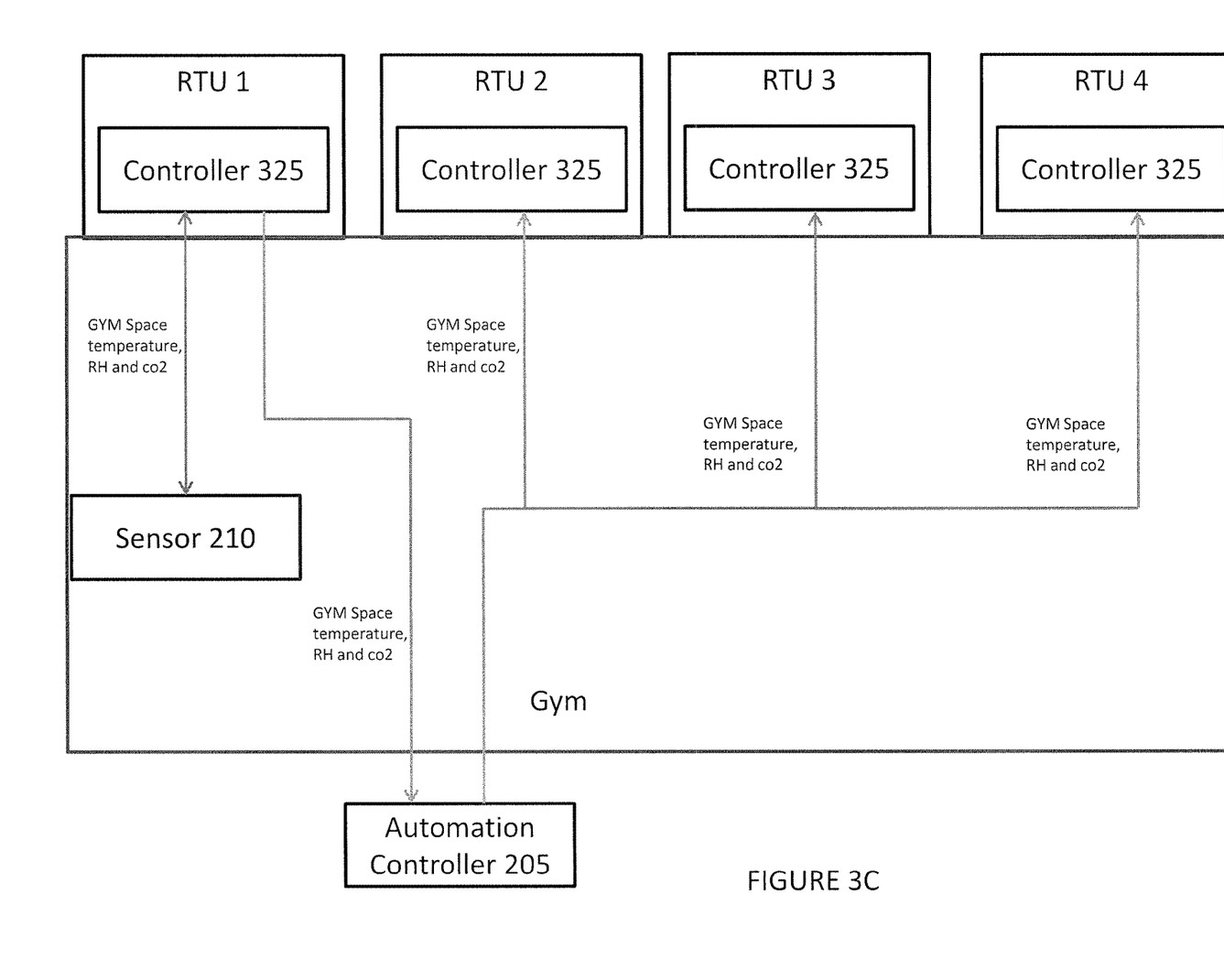
FIG. 3C illustrates an example linked system.

In certain embodiments, climate control system 200 may be linked to one or more other climate control systems to cool and/or heat a space as illustrated in FIG. 3C. For example, in a larger space such as a gymnasium, a climate control system may be linked with one or more other climate control systems to cool and/or heat the larger space. The one or more other climate control systems may include high side heat exchangers, loads, compressors, intakes, heaters, distributions, and controllers of their own. These controllers may be linked to automation controller 205. Sensor 210 may detect a temperature, relative humidity, carbon dioxide level, etc. of the gymnasium, and controller 325 of RTU 1 may determine that RTU 1 should activate. Controller 325 then communicates the detected environment information to automation controller 205. When automation controller 205 determines that the climate control system should be activated, automation controller 205 may provide signals to the other controllers 325 of RTU 2, RTU 3, and RTU 4 to activate their climate control systems. In this manner, the heating and/or cooling of a larger space is coordinated through a controller 325.

Figure 4:
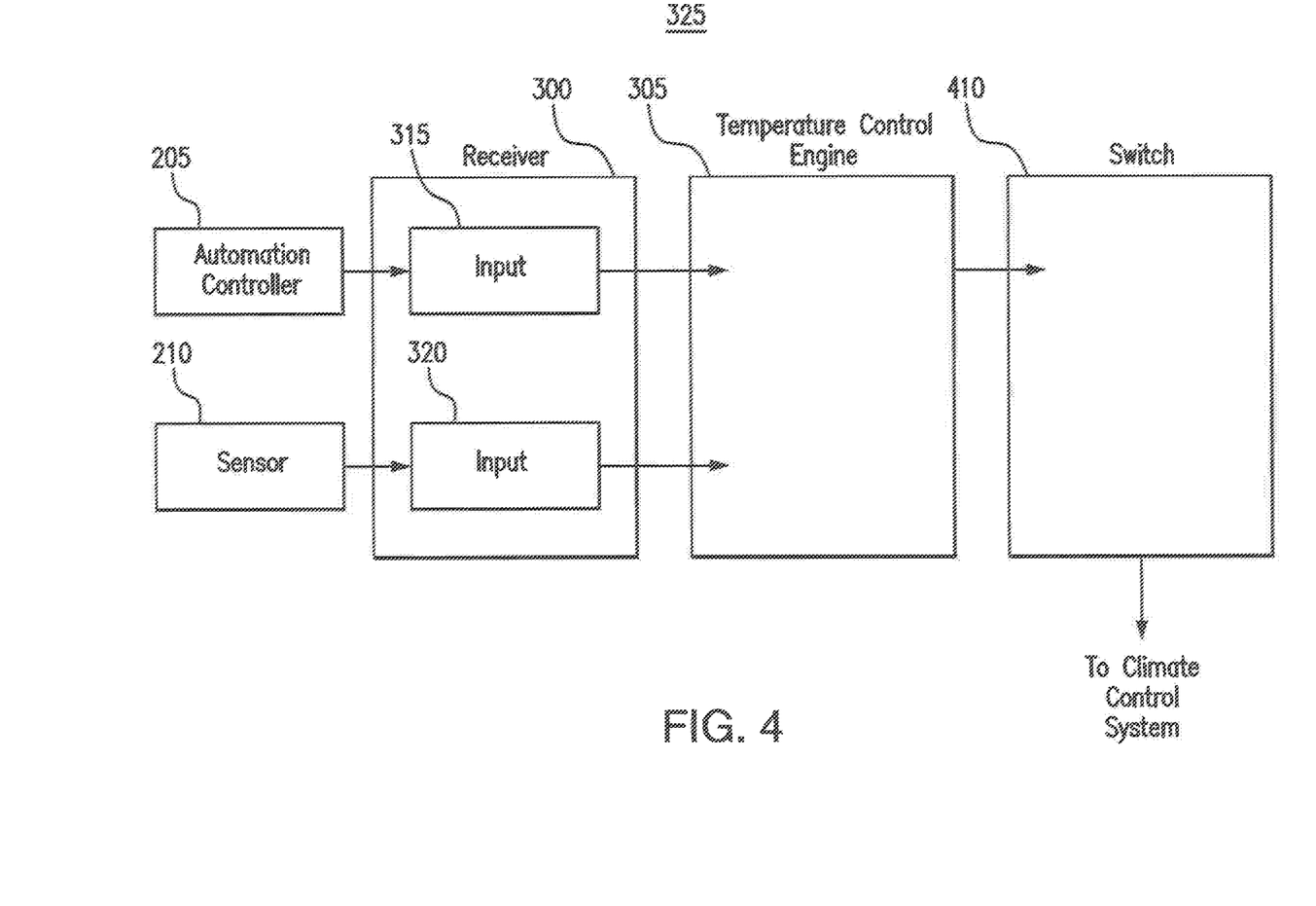
FIG. 4 illustrates an example climate control system controller.

FIG. 4 illustrates an example climate control system controller 325. As illustrated in FIG. 4, climate control system controller 325 includes a receiver 300, a temperature control engine 305, and a switch 410. In particular embodiments, climate control system controller 325 may allow for a user to override temperature set points set by an automation control thereby improving the comfort of the user.

Receiver 300 may receive input 315 from automation controller 205 and input 320 from sensor 210. Input 315 may indicate a temperature set point provided by automation controller 205. Input 320 may indicate a detected temperature of a space and/or a temperature set point provided by a user in that space. Receiver 300 may be any structure capable of receiving signals from automation controller 205 and sensor 210 such as, for example, a wire, a port, and/or a pin of touch sensor controller 325. An example algorithm for receiver 300 is as follows: wait for input from automation controller 205 and/or sensor 210; receive input from automation controller 205 and/or sensor 210; forward the received input to temperature control engine 305.

Temperature control engine 305 receives input 315 and input 320 from receiver 300. Temperature control engine 305 may analyze input 315 and input 320 to determine whether a climate control system should be activated and/or deactivated. For example, temperature control engine 305 may determine that a temperature set point provided by automation controller 205 is higher than a detected temperature of the space provided by sensor 210. As a result, temperature control engine 305 may deactivate the climate control system so as to not further cool the space. As another example, temperature control engine 305 may receive a new temperature set point from sensor 210. As a result, temperature control engine 305 may determine that the new temperature set point should override a temperature set point provided by automation controller 205. As a result, temperature control engine 305 may operate the climate control system based on the new temperature set point provided by sensor 210. As yet another example, temperature control engine 305 may determine that a new temperature set point provided by sensor 210 is lower than a detected temperature of the space provided by sensor 210. As a result, temperature control engine 305 may activate a climate control system to cool the space. An example algorithm for temperature control engine 305 is as follows: wait for input from receiver 300; receive input from receiver 300; determine based on a temperature set point provided by automation controller 205, a temperature set point provided by sensor 210, and a detected temperature provided by sensor 210 whether a climate control system should be activated and/or deactivated. Communicate determination to switch 410.

Switch 410 receives signals from temperature control engine 305 indicating whether switch 410 should activate and/or deactivate a climate control system. If switch 410 receives a signal to activate a climate control system, switch 410 may activate the climate control system. If switch 410 receives a signal to deactivate a climate control system, switch 410 may the climate control system. An example algorithm for switch 410 is as follows: wait for signal from temperature control engine 305; receive signal from temperature control engine 305; determine based on the signal whether a climate control system should be activated and/or deactivated; activate or deactivate the climate control system based on the determination. This disclosure contemplates switch 410 activating/deactivating both a cooling system and a heating system.

This disclosure contemplates controller 325 implementing one or more of receiver 300, temperature control engine 305, and switch 410 using any combination of hardware (e.g., a processor and a memory). A processor of controller 325 may be any electronic circuitry, including, but not limited to microprocessors, application specific integrated circuits (ASIC), application specific instruction set processor (ASIP), and/or state machines, that communicatively couples to a memory of controller 325 and controls the operation of climate control system 300. The processor may be 8-bit, 16-bit, 32-bit, 64-bit or of any other suitable architecture. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor may include other hardware and software that operates to control and process information. The processor executes software stored on memory to perform any of the functions described herein. The processor controls the operation and administration of climate control system 300 by processing information automation controller 205, sensor(s) 210, and the memory. The processor may be a programmable logic device, a microcontroller, a microprocessor, any suitable processing device, or any suitable combination of the preceding. The processor is not limited to a single processing device and may encompass multiple processing devices.

The memory may store, either permanently or temporarily, data, operational software, or other information for the processor. The memory may include any one or a combination of volatile or non-volatile local or remote devices suitable for storing information. For example, the memory may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory, a disk, a CD, or a flash drive. In particular embodiments, the software may include an application executable by the processor to perform one or more of the functions described herein.

Figure 5:
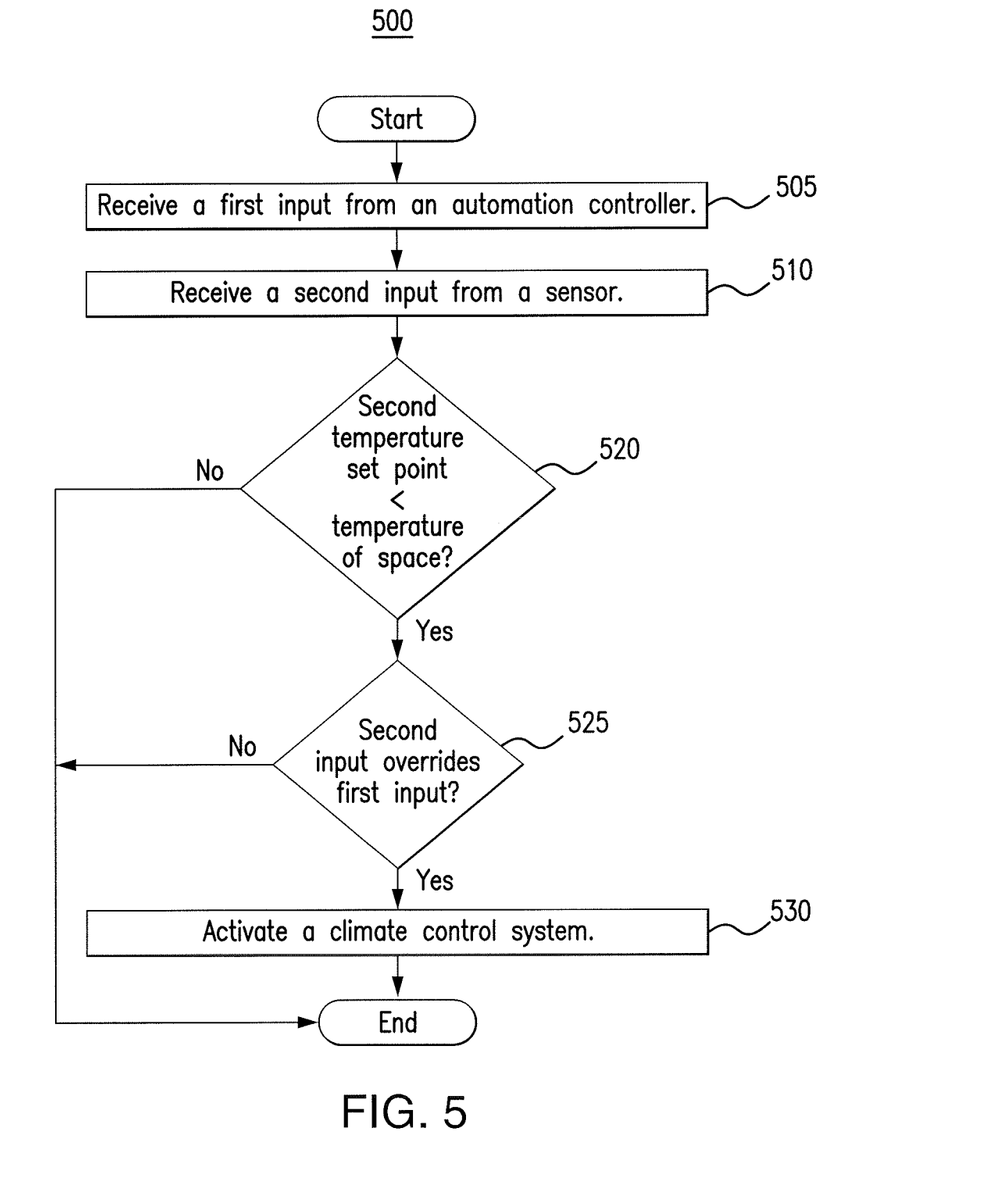
FIG. 5 is a flowchart illustrating a method of operating an example climate control system.

FIG. 5 is a flowchart illustrated a method 500 of operating an example climate control system. In particular embodiments, climate control system controller 325 performs method 500. By performing method 500, a climate control system controller 325 allows a user to override a temperature set point provided by an automation controller thereby improving the comfort of the user.

Climate control system controller 325 begins by receiving a first input from an automation controller in step 505. Climate control system controller 325 receives a second input from a sensor in step 510. The first input may indicate a temperature set point provided by the automation controller. The second input may indicate a detected temperature of a space and/or a temperature set point provided by a user.

In step 520, climate control system controller 325 determines whether a second temperature set point indicated by the second input is less than the detected temperature of the space. If not, then climate control system controller 325 may conclude method 500. If the second temperature set point is less than the temperature of the space, then climate control system controller 325 may proceed to step 525 to determine whether the second input overrides the first input. If the second input does not override the first input, then climate control system controller 325 may conclude method 500. In some embodiments, climate control system controller 325 may operate a climate control system based on the first temperature set point provided by the automation controller if the second input does not override the first input. If the second input overrides the first input, then climate control system controller 325 activates a climate control system in step 530 to cool the space based on the second temperature set point provided by the second input.

Modifications, additions, or omissions may be made to method 500 depicted in FIG. 5. Method 500 may include more, fewer, or other steps, and steps may be performed in parallel or in any suitable order. For example, step 525 may be performed before step 520. While discussed as climate control system controller 325 performing the steps, any suitable component or combination of components of system 200 may perform one or more steps of method 500.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:
1. A method comprising:
receiving, by the processor, a first temperature set point at which a first climate control system is to activate from an automation controller that is separate from the processor, a temperature, a humidity, and a carbon dioxide level of a space, and a second temperature set point;

determining, by the processor, a temperature difference between the first temperature set point and the second temperature set point;

determining, by the processor, that the temperature difference is less than a maximum temperature change limit;

comparing, by the processor, the second temperature set point with the temperature of the space to determine that the second temperature set point is lower than the temperature of the space;

determining, by the processor, that the second temperature set point overrides the first temperature set point based on the determination that the temperature difference is less than the maximum temperature change limit;

starting, by the processor, a timer configured to expire after a set period of time in response to determining that the second temperature set point overrides the first temperature set point and that the second temperature set point is lower than the temperature of the space;

in response to determining that the second temperature set point overrides the first temperature set point and to determining that the second temperature set point is lower than the temperature of the space, activating, by a switch, the first climate control system when the first temperature set point is above the temperature of the space and before the timer expires to cool a first portion of the space;

deactivating, by the processor, the first climate control system when the timer expires;

activating, by the processor, the dehumidifier to reduce the humidity of the space;

adjusting, by the processor, a position of the damper to reduce the carbon dioxide level of the space;

in response to determining that the first climate control system should be activated, communicating, by the processor, a signal to the automation controller; and activating, by the automation controller, a second climate control system in response to receiving the signal, wherein activating the second climate control system triggers the second climate control system to cool a second portion of the space.

2. The method of claim 1, further comprising deactivating, by the processor, the first climate control system in response to a determination to override the second temperature set point.

3. A climate control system controller comprising a hardware processor configured to:

receive a first temperature set point at which a first climate control system is to activate, a temperature, a humidity, and a carbon dioxide level of a space, and a second temperature set point;

determine a temperature difference between the first temperature set point and the second temperature set point;

determine whether the temperature difference is less than a maximum temperature change limit;

compare the second temperature set point with the received temperature of the space to determine whether the second temperature set point is below the received temperature of the space;

determine whether the second temperature set point overrides the first temperature set point based on a determination that the temperature difference is less than the maximum temperature change limit;

start a timer configured to expire after a set period of time in response to determining that the second temperature set point overrides the first temperature set point and that the second temperature set point is lower than the temperature of the space;

in response to determining that the second temperature set point overrides the first temperature set point and to determining that the second temperature set point is lower than the temperature of the space, activate the first climate control system when the received temperature of the space is below the first temperature set point and before the timer expires;

deactivate the first climate control system when the timer expires;

activate a dehumidifier to reduce the humidity of the space; and adjust a position of a damper to reduce a carbon dioxide level of the space; and in response to determining that the first climate control system should be activated, communicate a signal to an automation controller separate from the hardware processor, wherein the signal triggers the automation controller to activate a second climate control system.

4. The climate control system controller of claim 3, wherein the hardware processor is further configured to deactivate the first climate control system in response to a determination to override the second temperature set point.

5. A system comprising:

a first cooling system configured to cool a first portion of a space;

a second cooling system configured to cool a second portion of the space;

an automation controller configured to provide a first temperature set point;

sensors configured to detect a temperature, a humidity, and a carbon dioxide level of the space;

a dehumidifier;

a damper; and a first hardware controller separate from the automation controller, the first hardware controller configured to:

receive a second temperature set point that is provided by a user;

determine a temperature difference between the first temperature set point and the second temperature set point;

determine whether the temperature difference is less than a maximum temperature change limit;

determine whether the second temperature set point is lower than the detected temperature of the space;

determine whether the second temperature set point overrides the first temperature set point based on a determination that the temperature difference is less than the maximum temperature change limit;

start a timer configured to expire after a set period of time in response to determining that the second temperature set point overrides the first temperature set point and that the second temperature set point is lower than the detected temperature of the space;

in response to determining that the second temperature set point overrides the first temperature set point and to determining that the second temperature set point is lower than the detected temperature of the space, activate the first cooling system when the first temperature set point is above the detected temperature of the space and before the timer expires;

deactivate the first cooling system when the timer expires;

activate the dehumidifier to reduce the humidity of the space;

adjust a position of the damper to reduce the carbon dioxide level of the space; and in response to determining that the first cooling system should be activated, communicate a signal to the automation controller, the automation controller further configured to activate the second cooling system in response to receiving the signal.

6. The system of claim 5, wherein the first hardware controller is further configured to deactivate the first cooling system in response to a determination to override the second temperature set point.

7. The system of claim 5, wherein the sensors are located within the space and the first hardware controller is not located within the space.

8. The system of claim 5, wherein the first hardware controller is further configured to receive an occupancy status of the space.

9. The system of claim 5, wherein the automation controller is further configured to cancel the override of the first temperature set point by the second temperature set point.

* * * * *